United States Patent
Schild

(10) Patent No.: US 6,687,869 B1
(45) Date of Patent: Feb. 3, 2004

(54) METHOD FOR EVALUATING A PRESENTATION LAYER DATA UNIT

(75) Inventor: Bernhard Schild, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,429

(22) PCT Filed: Sep. 17, 1999

(86) PCT No.: PCT/DE99/02982

§ 371 (c)(1),
(2), (4) Date: Mar. 29, 2001

(87) PCT Pub. No.: WO00/19737

PCT Pub. Date: Apr. 6, 2000

(30) Foreign Application Priority Data

Sep. 30, 1998 (DE) .......................................... 198 45 109

(51) Int. Cl.$^7$ ............................................... G06F 11/00
(52) U.S. Cl. ............................ 714/746; 714/57; 714/33; 714/46
(58) Field of Search ................................ 714/746, 706, 714/724, 733, 734, 741, 742, 799, 811, 25, 32, 33, 37, 46, 47, 48, 49, 57; 709/223, 224

(56) References Cited

U.S. PATENT DOCUMENTS

| | | | | |
|---|---|---|---|---|
| 5,155,842 A | * | 10/1992 | Rubin | .......................... 714/22 |
| 6,421,323 B1 | * | 7/2002 | Nelson et al. | ............... 370/249 |
| 2001/0040912 A1 | * | 11/2001 | Gibbons et al. | ............ 375/133 |

OTHER PUBLICATIONS

A Q3 Interface for Managing a National Telecommunications Network: Motivatio and Implementation, Huslende et al., pp. 1657–1661.

XP 000627239 –A CMIS–Capable Scripting Language and Associated Lightweight Protocol for TMN Applications, Pavlou et al., pp. 82–87.

Prototype Active Q Adaptor Based on Corba Platform, Yamashita et al., pp. 1682–1687.

ITU–T X.711 (10/97) Series X: Data Networks and Open System Communication —OSI Management —Management Communication Services and Protocol.

ITU–T X.710 (10/97) Series X: Data Networks and Open System Communication —Information technology —Open Systems Interconnection —Common Management Information Services.

ITU–T X.226 (7/94) Data Networks and Open System Communications —Information Technology —Open Systems Interconnection —Connection—Oriented Presentation Protocol: Protocol Specification.

ITU–T M.3100 (7/98) Series M: TMN and Network Maintenance: International Transmission Systems, Telephone Circuits, Telegraphy, Facsimile and Leased Circuits —Generic network information model Corrigendum 1.

ITU–T M.3010 (5/96) Series M: Maintenance International Transmission Systems, Telephone Circuits, Telegraphy, Facsimile and Leased Circuits —Principles for a Telecommunications management wntwork.

* cited by examiner

Primary Examiner—Christine T. Tu
(74) Attorney, Agent, or Firm—Bell Boyd & Lloyd

(57) ABSTRACT

A method for evaluating a presentation layer data unit wherein, in order to evaluate a presentation layer data unit, which contains application-oriented messages that are coded according to a predefined coding protocol and destined for at least one application process running on a Q3 platform, and which is received via an association established on a Q3 interface between the Q3 platform and a partner Q3 platform, the Q3 platform checks the format of the data unit for compliance with the coding protocol. Provided there are no errors in the coding, the user data contained in the data unit is decoded, the application-oriented messages are determined, and these messages are forwarded to the appropriate application process(es). However, if an error concerning the user data is detected in the coding, then the evaluation is terminated and a corresponding error report is sent to the application process concerned. This application process then generates an error response to the coding error in the form of an application error message, and sends it to the partner Q3 platform.

7 Claims, No Drawings

METHOD FOR EVALUATING A PRESENTATION LAYER DATA UNIT

BACKGROUND OF THE INVENTION

1. Field of the Invention

The present invention relates to a method for evaluating a presentation layer data unit, which contains application-oriented messages, coded according to a predefined coding protocol, for at least one application process running on a Q3 platform. The presentation layer data unit is received by the Q3platform via an association established on a Q3interface between the Q3 platform and a partner Q3platform, where:

the format of the data unit is checked for compliance with the predefined coding protocol;

the user data contained in the data unit is decoded (provided there are no errors in the coding);

the application-oriented messages are determined;

these messages are forwarded to the appropriate application process(es).

The invention equally relates a Q3 platform with at least one Q3 interface, on which associations with a partner Q3 platform can be established, with an application layer for application processes running on the Q3 platform, and a presentation machine to receive presentation layer data units via the associations. The data units contain application-oriented messages for at least one of the application processes, and these messages are coded according to a predefined coding protocol. The presentation machine, which evaluates these data units, is configured to check the format of the data unit for compliance with the predefined coding protocol;

to decode the user data contained in the data unit (provided there are no errors in the coding);

to determine the application-oriented messages; and to forward these messages to the appropriate application processes.

Q3 platforms and Q3 interfaces are used in the context of a so-called control network, in accordance with various standards specified by the International Telecommunications Union (ITU), and particularly the Recommendations M.3010 and M.3100. There follows a brief explanation of the main concepts of the control network, since these are required in order to understand the invention. Further information about this subject can be found in the aforementioned ITU Recommendations M.3010 and M.3100, and in ITU 2. Description of the Prior Art Modern telecommunication networks generally comprise a large number of switching and transmission components. These are subsequently referred to as network elements (NE), in accordance with the aforementioned ITU recommendations. In order to provide comprehensive overall control of the network elements in a telecommunications network, with regard to operations, administration and maintenance (OAM), the Standards M.3010 and M.3100 propose an independent control network for processing information, and this is referred to as a telecommunications management network (TMN). Among other components, the TMN includes the network elements as terminal stations, and accesses the network elements via standardized interfaces and protocols. The TMN receives control-oriented reports from the network elements, which it controls. The control network includes an operations center, also known as an operations system or OS (of which there may be more than one), which allows centralized OAM control of the telecommunication network, as well as operation and monitoring of the control network by maintenance staff via terminals.

Switching centers in the telecommunication network are directly connected to the operations center via a so-called Q3 interface. The term Q3 platform refers to a network node that has one or more Q3 interfaces and is part of a control network. In particular, this includes the aforementioned switching centers with Q3 interfaces and the operations center of the control network. Another example of an interface type, which is not particularly important for the present invention, is the so-called Q2 interface. This is less complex, is intended for simpler network elements, and is used to connect network elements to the operations center indirectly via intermediate stations.

In accordance with ITU Recommendations X.710 and X.711, a common management information service (CMIS) is used at the Q3 interfaces in a control network, to exchange messages and commands relating to network control. A connection established between a control center and a network element is called an association. The operations center can use an association to send commands from the CMIS service, otherwise known as CMISE operations (common management information service element), to the network element. In this context, a single association can be used to transfer CMISE operations for a number of processes belonging to CMIS applications, which may be running concurrently on the same Q3 platform.

For the purposes of the association, and in particular the CMIS service, message transfers are based on the protocol layer architecture as defined in the OSI 7-layer model (cf. ITU Recommendation X.200) The present invention is only concerned with the top two layers of the OSI 7-layer model, namely layer 6 (the 'presentation layer') and layer 7 (the 'application layer'). According to the OSI 7-layer model, the application layer contains the application-specific processes, in particular the CMISE operations, and relies on the functions of the presentation layer for this purpose. The presentation layer is used to generate a common coding for participating Q3 platforms on the basis of functions in layer 5, otherwise known as the 'session layer' which provides communication control functions. The present invention is not concerned with layers 1 to 5.

When transferring CMISE operations via an association with the partner platform, the operations are passed from the application layer to the presentation layer. A so-called PPM (presentation-layer protocol machine) is provided on each Q3 platform to perform the data transfer at the presentation layer. Messages are exchanged between PPMs on the Q3 platforms in the form of so-called PPDUs (presentation-layer protocol data units). The structure of PPDUs and the procedure for transferring messages based on PPDUs are specified by a predefined coding protocol. In accordance with the standards for the Q3 interface, the coding protocol is defined by the so-called 'basic encoding rules' as per ITU Recommendation X.209, and by syntax based on the so-called ASN structure as per ITU Recommendation X.208. PPDUs received over the association are checked and decoded by the PPM in accordance with the coding protocol (provided there are no errors). The data for the application processes is then determined, and the application-oriented messages thus obtained are passed to the application layer. Here, they are forwarded to the appropriate application processes.

However, if the PPM detects a contravention of the predefined coding rules or deviation from the predefined syntax during the transfer and subsequent decoding of a PPDU, then the PPDU concerned is flagged as invalid. In this case, the specified standards stipulate that a termination report should be displayed at the application layer, and the association should be shut down by sending a so-called ARP-PPDU (abnormal release provider PPDU) to the PPM on the partner platform. In this context, it is of no importance to the presentation layer whether the deviation from coding rules or syntax in the PPDU relates to the parameters required for processing within the presentation layer, or only concerns user data (data in the application layer); e.g., payload data in CMISE commands. Consequently, even if an attribute of the user data in a single application-layer operation is "incompatible" with the coding protocol, this will result in the whole association being terminated. In particular, this connection termination includes the termination of other CMIS application processes running over this association, loss of the messages and acknowledgments being transferred over the association, and delay in the transmission of further operations, since a new association has to be established for this purpose. The reason for the connection termination, and in particular the original operation on the Q3 interface or the parameter value that triggered the termination, cannot be determined from the reports that are exchanged in accordance with the standards, namely the termination report and the ARP-PPDU.

Therefore, a connection termination may be caused not only by problems in the application and/or presentation layer, but also by problems in the underlying layers of the protocol layer architecture; e.g., in equipment (as in layer 1, the transmission layer) or in a timeout circuit (as in layer 4, the transport layer, or in one of the layers below). General system problems can also occur, such as a temporary lack of resources. As a result, a connection termination generally gives rise to resource-intensive analyses. In particular, the Q3 platform that is "active" in relation to the association (normally the operations center) must start queries for all of the terminated applications or operations, to clear faults and/or initiate a repetition as appropriate. Due to the possible loss of notifications, it is also necessary to read out and evaluate log files.

The aim of the present invention is 'therefore' to demonstrate a way to avoid termination of the association concerned in the case of a decoding problem relating to application data in the presentation layer, and to allow signaling to take place relating to the unsatisfactory parameters. At the same time, this invention should be interoperable with the aforementioned ITU standards, and in particular Recommendations X.710 and X.711 relating to the CMIS service, where it is assumed that compatible message transfer is still possible with standard-compliant Q3 platforms.

SUMMARY OF THE INVENTION

Such aim is achieved by a method for evaluating a presentation layer data unit, which contains application-oriented messages, coded according to a predefined coding protocol, for at least one application process running on a Q3 platform, wherein the presentation layer data unit is received by the Q3 platform via an association established on a Q3 interface between the Q3 platform and a partner Q3 platform, and wherein the format of the data unit is checked for compliance with the predefined coding protocol, the user data contained in the data unit is decoded if there are no errors in the coding, the application-oriented messages are determined, and the messages are forwarded to the appropriate application processes.

According to the present invention, if an error concerning the user data is detected in the coding, then the evaluation is terminated and a corresponding error report is sent to the application process concerned. This application process then generates an error response to the coding error in the form of an application error message, and sends it to the partner Q3 platform.

With the type of error handling in this solution, it is only necessary to terminate an association (as stipulated in ITU Recommendation X.226) ax if the PPDU as such is not "properly formed"; i.e., parameters essential to the presentation layer as such cannot be correctly determined in the received data unit. Otherwise, the application-oriented parameters can be identified and decoding problems can only occur in parts of the application processes, in which case error handling at the application level initiates the appropriate remedy for the error that has been detected. This significantly simplifies the task of error diagnosis on both of the Q3 platforms involved.

The result is clearly beneficial, since it prevents termination of the association over which the invalid data unit was transferred, and prevents the message intended to shut it down; e.g., the aforementioned ARP-PPDU.

The above aim is likewise achieved by a Q3 platform with at least one Q3 interface, on which associations with the partner Q3 platform can be established, with an application layer for application processes running on the Q3 platform, and a presentation machine to receive presentation layer data units via the associations, wherein the data units contain application-oriented messages for at least one of the application processes, and these messages are coded according to a predefined coding protocol, and wherein the presentation machine is configured so as to check the format of the data unit for compliance with the predefined coding protocol, to decode the user data contained in the data unit if there are no errors in the coding, to determine the application-oriented messages, and to forward the messages to the appropriate application processes.

The above aim is likewise achieved by a Q3 platform of the type defined at the outset. The presentation machine is configured to terminate the evaluation in the event of an error in the coding of the user data in a data unit, and forward this error to the application layer. As a consequence of an error report relating to a user-data coding error in a presentation-layer data unit, the application layer is configured to generate an error response pointing out the coding error, in the form of an application error message from the application process concerned, and send it to the partner Q3 platform.

In a beneficial implementation of the present invention, which facilitates detection of the error, if the data unit concerns the creation of a data object, and a coding error is discovered relating to the attribute list of the data object to be created, then an error message is generated and sent, in which an invalid attribute value is reported and a reference to the incorrect attribute is included.

It is likewise beneficial pursuant to an embodiment of the present invention if the data unit concerns the modification of data objects and/or attributes, and a coding error is discovered relating to the list of modifications, to generate and send an error message, in which the non-feasibility of at least one modification is reported, and the message parts relating to this/these modification(s) are identified accordingly.

It is likewise beneficial, pursuant to another embodiment of the present invention if a coding error in the data unit is discovered relating to an application parameter in a filter operation, to generate and send an error message, in which an invalid filter operation is reported.

It is likewise beneficial, pursuant to a further embodiment of the present invention if the data unit concerns the execution of at least one action by an application process, and a coding error is discovered relating to the information for the action(s) to be executed, to generate and send an error message, in which an invalid attribute value is reported, and a reference to the incorrect information and/or its type is included.

It is also advantageous, pursuant to yet another embodiment of the present invention in the case of a coding error relating to several items of application data, if an error message is generated and sent, which reports the use of a parameter that has not been defined for the application process with reference to the data unit.

Additional features and advantages of the present invention are described in, and will be apparent from, the following Detailed Description of the Preferred Embodiments and the Drawings.

In some places, reference will be made to the English-derived identifiers that have been created in the ITU standards as names (so-called identifiers) for parameters and data objects. These technical expressions are well known to experts in the field, and are enclosed in single quotation marks for the purposes of this description, e.g. 'ActionInfoArgument'.

DETAILED DESCRIPTION OF THE PREFERRED EMBODIMENTS

It is assumed that an association has been established on a Q3 interface between one Q3 platform and a second Q3 platform, which is subsequently referred to as the partner Q3 platform or simply the partner platform to avoid confusion. PPDUs are received by the Q3 platform over the association. As a rule, the Q3 platform will be a network element, while the partner platform sending the PPDUs is the operations mi center of the control network. Other configurations are of course possible; e.g., where an operations center is the (receiving) Q3 platform.

In accordance with the present invention, when decoding the PPDU, the PPM on the Q3 platform that has received a PPDU differentiates between the application data, i.e. the data contents relating to a CMIS application, and the protocol structure data relating to the presentation layer. Consequently, when decoding the PPDU, the structure must firstly be correct with reference to the presentation layer. If decoding problems occur at this stage, then the association is terminated as usual in accordance with ITU standards. Although such problems are symptomatic of serious errors in the PPM of the partner platform, they are nonetheless rare, since the components of a PPM are thoroughly tested as a rule.

By comparison, if a coding error is found in application-oriented data in the PPDU, then the decoding problems are handled in a similar way to semantic errors identified by a CMIS application. It is beneficial for the error message to include details of individual, incorrect attribute values. In particular, a termination of the relevant association is avoided. In this context, the event that generated the error is of no importance to the present invention, since the present invention is only concerned with evaluation by the receiving Q3 platform and its response to an error in the received data unit.

The decoding problem may include, for example, an incorrectly presented or unauthorized value in an object model part of a CMIS application, such as an attribute value or a so-called 'ActionInfoArgument'. The error is then associated with the relevant CMISE operation and, if possible, with the corresponding operation parameter. The partner platform is notified via corresponding CMISE error message. It should be noted at this point that, in accordance with current practice, the application object models are loaded in the active partner platform; i.e., they should be considered as input data with the potential errors identified in this context.

For the purposes of the present invention, a distinction is made between "simple" and "serious" errors, and one of the error messages defined in the specified ITU standards is used accordingly.

A "serious" error occurs if the received PPDU can be decoded by the presentation layer in accordance with the coding protocol, but the presentation of one or more application-oriented parameters in the PPDU contravenes the 'Basic Encoding Rules'. For the purposes of the present invention, a so-called 'MistypedArgument' error message is used in this case, which actually reports the use of a parameter that has not been agreed between the CMISE users. "Simple" errors refer to a single parameter, where it is also possible to define why the parameter is not permissible. In the same way, other error messages can be used, e.g. of the type 'InvalidAttributeValue' or 'InvalidFilter', where additional parameters of the relevant error message type can be used to send additional, more specific information about the error that has been found. If none of the error types defined in the standard accurately describes the error that has been found, then a 'MistypedArgument' error message is generated and sent.

For example, the following error reports may be generated in the event of decoding problems:

1. An 'M_CREATE' operation (which concerns the creation of a data object, according to ITU Standard X.710) is rejected, due to a coding error relating to the 'AttributeList' of the data object to be created, via an 'InvalidAttributeValue' error message (which itself reports an invalid attribute) and a reference to the incorrect attribute.

2. An 'M_SET' operation (which concerns the modification of data objects and/or attributes, according to ITU Standard X.710) is rejected, due to a coding error relating to elements of the 'ModificationList', via a 'SetListError' error message (which itself reports the non-feasibility of at least one modification), where those modification message parts ('Modifications') in which errors were found are given the error status 'InvalidAttributeValue'. Processing of the other 'Modifications' is also rejected, but this time with the error status 'AccessDenied'. In another variant (see below), processing of the other 'Modifications' is not rejected, and the corresponding modifications are performed.

3. An 'M_SET' operation, an 'MGET' operation (which concerns a request for attributes, according to ITU Standard X.710), an 'M_DELETE' operation (which concerns the deletion of a data object, according to ITU Standard X.710) or an 'M_ACTION' operation (which is provided for actions performed by Q3 applications, according to ITU Standard X.710) is rejected, due to a coding error relating to an application parameter within the 'CMISE_FILTER' parameter, via an 'InvalidFilter' error message (which itself reports an invalid filter operation).

4. An 'M_ACTION' operation is rejected, due to a coding error relating to the information for the action to be performed (so-called ('ActionInformation'), via an 'InvalidAttributeValue' error message, which specifies the incorrect action information ('ActionType' and 'ActionInfoArgument' parameters).

However, it is not necessary to reject the 'M_ACTION' operation if the action can also be performed without the action information. For example, this is possible if as part of its definition the action has standard assignments for the invalid parameters, and can give a reference to these non-compliant parameters within the acknowledgment report relating to the action that has been performed.

5. Any of the aforementioned operations may otherwise be rejected, due to a coding error relating to application parameters or other parameters, by means of a 'MistypedArgument' error message.

Using the inventive procedure, it is possible to avoid termination of the association in the event of decoding problems in many cases. In addition, based on the type of error message and its contents if applicable, which refer specifically to the incompatible value, it is significantly easier for the partner platform to reliably identify the error. The present invention makes it possible to obtain information from the error message about the actual operations or application data that caused the error. In these cases, there is no need to fear a reduced level of availability or an associated loss of messages. Furthermore, the costs involved in terminating a connection and establishing a new one are avoided.

It should be noted that the present invention introduces a variation in the distribution of tasks between the application layer and the presentation layer of the protocol layer structure as defined in ITU Standard X.200, since individual PPM tasks are actually passed to the CMIS applications. In this respect, the present invention contravenes the X.200 standard, and the inventive procedure for handling decoding problems can only be implemented on a Q3 platform that is able to support a protocol layer architecture that deviates from the X.200 standard. By contrast, the range of tasks performed by the presentation layer is reduced, and these parts are transferred to the application layer. At the same time, however, the present invention allows the application layer to respond to the various error cases as appropriate and at equally low cost.

For the purposes of the present invention, a distinction is made between the following coding errors:

a) Coding errors in the user parameters, which can be answered with specific error messages;

b) Coding errors in the user parameters, which can be answered with a non-specific error message;

c) Coding errors that can be attributed to problems in the presentation layer.

In accordance with the present invention, those errors described by a) and b) are dealt with in the application layer (layer 7), while only those errors described by c) are dealt with in the presentation layer (layer 6) and require termination of the connection accordingly. By contrast, ITU Recommendations X.200 and X.226 require that all three error types be dealt with in the presentation layer, as a result of which the connection must also be terminated in all three cases.

It is important to emphasize in this context that the present invention does not place any demands beyond those of the specified ITU standards, in particular X.710 and X.711, on the partner platform connected to the Q3 platform that has been implemented in accordance with the present invention. With regard to the partner platform, the inventive "minimum-fuss" procedure for handling error occurrences is transparent, since these only can be resolved generally by the partner platform by modifying the object model, in which case "simple" and "serious" errors are equally disruptive.

Further variants of the present invention, which also overstep the boundaries of the Recommendation X.720, concern the execution or non-execution of invalid operations and the associated error message.

The so-called 'M_SET' operation includes a list of modifications to user data. According to Recommendation X.720, those modifications that are supported by the application should be performed, i.e. the 'M_SET' operation should be executed, at least in part, as far as is possible. According to the variant, however, the 'M_SET' operation is rejected completely, i.e. for all modifications, in the event of a coding problem, even if it relates to only one of the modifications, in which case modifications that are correct in terms of the coding protocol are included in the so-called 'SetListError' error message with the error status 'AccessDenied'.

This is appropriate, since if there is a decoding problem in an 'M_SET' operation, it can be assumed that the object model of the partner platform sending the operation is not correct. Besides, decoding problems that can occur in this context concern application parameters that are known to the Q3 platform, not unknown parameters. According to X.720, user parameters that are unknown to the Q3 platform could be ignored here, without adversely affecting the execution of further modifications. However, the partial execution of modifications contained in the 'M_SET' operation, where there are decoding problems with application parameters that are known to the Q3 platform, can lead to unintended modifications of the switching center and possibly to unplanned system statuses in some cases, and can obscure the decoding problem. A complete rejection should also provoke a correction of the object model (or possibly only the input data) in the partner platform sending the operation.

Although the present invention has been described with reference to specific embodiments, those with skill in the art will recognize that changes may be made thereto without departing from the spirit and scope of the invention as set forth in the hereafter appended claims.

I claim:

1. A method for evaluating a presentation layer data unit, which contains application-oriented messages, coded according to a predefined coding protocol for at least one application process running on a Q3 platform, the method comprising the steps of:

receiving the presentation layer data unit by the Q3 platform via an association established on a Q3 interface between the Q3 platform and a partner Q3 platform;

checking a format of the data unit for compliance with the predefined coding protocol;

determining if there are any errors in the coding;

if there are no errors in the coding, decoding user data contained in the data unit, determining the application-oriented messages, and forwarding the application-oriented messages to the appropriate application processes; and if there are errors in the coding, terminating the evaluation of the presentation layer data unit, sending the corresponding error report to the application process concerned, generating an error response, via the application process, to the coding error in the form of an application error message, and sending the error response to the partner Q3 platform.

2. A method for evaluating a presentation layer data unit as claimed in claim 1, wherein, if the data unit concerns creation of a data object, and a coding error is discovered relating to an attribute list of the data object to be created, an error message is generated and sent in which an invalid attribute value is reported and a reference to an incorrect attribute is included.

3. A method for evaluating a presentation layer data unit as claimed in claim 1, wherein, if the data unit concerns modification of data objects, and a coding error is discovered relating to a list of modifications, an error message is generated and sent in which non-feasibility of at least one modification is reported and message parts relating to the at least one modification are identified.

4. A method for evaluating a presentation layer data unit as claimed in claim 1, wherein, if a coding error in the data unit is discovered relating to an application parameter in a filter operation, an error message is generated and sent in which an invalid filter operation is reported.

5. A method for evaluating a presentation layer data unit as claimed in claim 1, wherein, if the data unit concerns execution of at least one action by an application process, and a coding error is discovered relating to information for the action to be executed, an error message is generated and sent in which an invalid attribute value is reported and a reference to incorrect information is included.

6. A method for evaluating a presentation layer data unit as claimed in claim 1, wherein, if there is a coding error relating to several items of application data, an error message is generated and sent which reports use of a parameter that has not been defined for the application process with reference to the data unit.

7. A Q3 platform with at least one Q3 interface, on which associations with a partner Q3 platform can be established, comprising:

an application error for application processes running on the Q3 platform; and a presentation machine to receive presentation layer data units via the associations, the data units containing application-oriented messages for at least one of the application processes, and the application-oriented messages being coded according to a predefined coding protocol;

wherein the presentation machine checks a format of the data unit for compliance with the predefined coding protocol, determines if there are any errors in the coding, and, if there are no errors in the coding, decodes the user data contained in the data unit, determines the application-oriented messages, and forwards the application-oriented messages to the appropriate application processes, and, if there are errors in the coding, terminates an evaluation of the presentation layer data unit, and forwards the errors to the application layer; and wherein the application layer, in response to an error report relating to a user-data coding error in a presentation-layer data unit, is configured to generate an error response pointing out the coding error, in the form of an application error message from the application process concerned and sends the error response to the partner Q3 platform.

* * * * *